United States Patent [19]

Chen

[11] Patent Number: 5,813,647

[45] Date of Patent: Sep. 29, 1998

[54] RETAINING/FIXING DEVICE

[76] Inventor: Ming-Chi Chen, No.25, lane 163, Kuo Tzu Keng, Ta-Ping City, Taichung Hsien, Taiwan

[21] Appl. No.: 831,437

[22] Filed: Apr. 1, 1997

[51] Int. Cl.$^6$ .............................. B60P 7/15; B61D 45/00
[52] U.S. Cl. .................. 248/354.7; 410/151; 248/354.1
[58] Field of Search .............................. 248/354.7, 354.1, 248/354.3, 200.1; 410/128, 151; 254/108; 52/632

[56] References Cited

U.S. PATENT DOCUMENTS

| 2,974,931 | 3/1961 | Reel et al. | 248/354.1 X |
|---|---|---|---|
| 3,049,328 | 8/1962 | Bishop | 52/632 |
| 4,343,578 | 8/1982 | Barnes | 410/151 |
| 4,434,970 | 3/1984 | Boland et al. | 254/108 |
| 4,669,934 | 6/1987 | Wisecarver | 410/151 |
| 4,781,499 | 11/1988 | Wisecarver | 410/151 |
| 5,094,576 | 3/1992 | Fredelius | 410/151 |
| 5,443,342 | 8/1995 | Huang | 410/151 |
| 5,472,301 | 12/1995 | Wallen | 410/151 |

Primary Examiner—Ramon O. Ramirez
Assistant Examiner—Long Dinh Phan
Attorney, Agent, or Firm—Rosenberg, Klein, & Bilker

[57] ABSTRACT

A retaining/fixing device is disclosed. It is applicable in a container and a construction site and can be used as a jack. The retaining/fixing device mainly includes a base seat, an outer tube, an inner rod, a rack, a handle, a first claw, a second claw, a resilient plate and a stopper pin. By means of reciprocally lifting and depressing the handle, the outer tube is displaced relative to the inner rod so that the retaining/fixing device is forcedly tightened to a necessary extent. Also, the inner rod can be quickly drawn out or retracted into the outer tube.

3 Claims, 6 Drawing Sheets

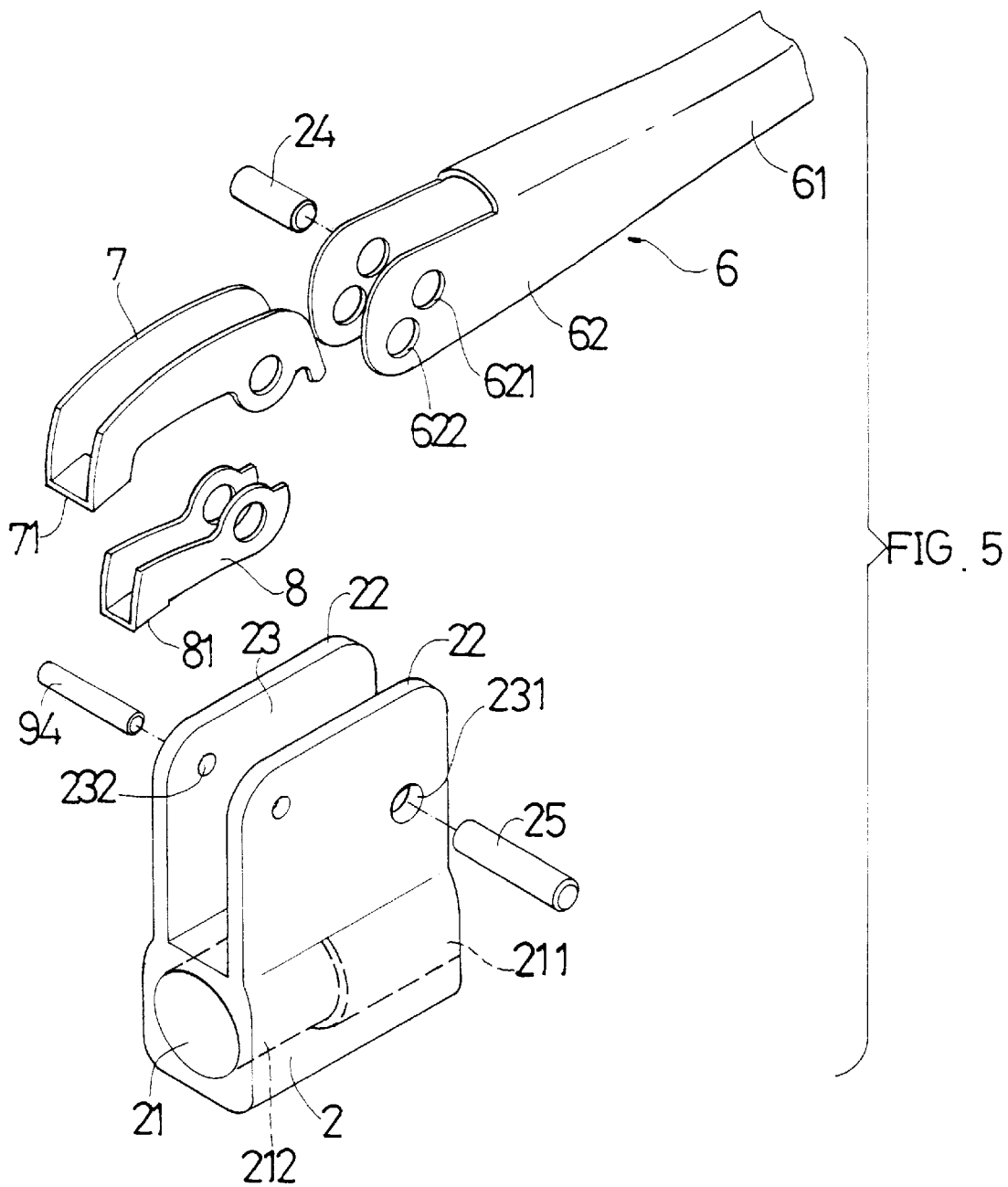
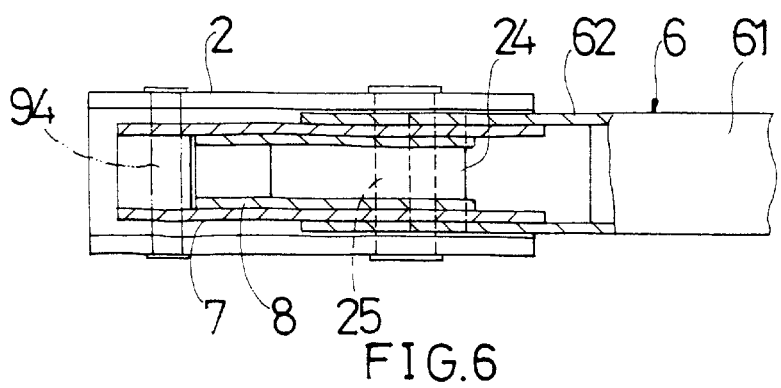

RETAINING/FIXING DEVICE

BACKGROUND OF THE INVENTION

The present invention relates to a retaining/fixing device, and more particularly to a retaining/fixing device which can be quickly adjusted to a predetermined length and forcedly stretched and tightened for retaining and fixing articles.

Conventional retaining/fixing devices include two types, that is, retaining/fixing rod 13 and retaining/fixing device 15.

Referring to FIGS. 1 and 2, generally, in a container 11, after loading cargoes 12, several horizontally stretched retaining/fixing rods 13 are used to fix the cargoes. The retaining/fixing rod 13 mainly includes a hollow central tube 131 formed with inner thread and two end tubes 132 respectively disposed at two ends of the central tube 131. The end of each end tube 132 is disposed with a contacting pad 133. In use, a user must slowly rotate the end tubes outward with both hands. The retaining/fixing rod 13 will be extended only by a very short distance after each circle of rotation, so that in the case that the distance between the inner walls of the container 11 is 2 meters, at least several decades of circles of rotation will be necessary for extending the retaining/fixing rod to the desired extent. It is laborious and time-consuming to extend or retract the end tubes 132. Moreover, after the retaining/fixing rod 13 contacts with the inner walls of the container 11, it is very difficult to further tighten the retaining/fixing rod 13 by the strength of the hands. Therefore, the retaining/fixing rod 13 can hardly firmly fix the cargoes 12. In case an urgent braking, abrupt accelerating or violent shocking takes place during transferring, the cargoes are very easy to drop down.

FIG. 3 shows the other conventional retaining/fixing device 15 which includes a fixing sleeve 151, an outer tube 152, an inner tube 153, a rack 154, a pushing bar 155, a spring latch 156 and a resilient member 157. Such retaining/fixing device 15 has a shortcoming as follows:

After a user depresses the pushing bar 155, the rack 154 and the inner tube 153 will only forward extend through a short distance. Thereafter, they cannot further forward extend. Therefore, the retaining/fixing device can only achieve a limited tightening effect. The pushing bar 155 cannot be repeatedly depressed to create more extent of tightness. Accordingly, in case an urgent braking, abrupt accelerating or violent shocking takes place during transferring, the cargoes 12 are also very easy to drop down.

SUMMARY OF THE INVENTION

It is therefore a primary object of the present invention to provide a retaining/fixing device in which the handle can be repeatedly lifted and depressed to forcedly tighten the device to a necessary extent.

It is a further object of the present invention to provide the above retaining/fixing device in which the inner rod can be quickly drawn out or retracted.

It is still a further object of the present invention to provide the above retaining/fixing device which is also applicable to construction site or can serve as a jack.

The present invention can be best understood through the following description and accompanying drawings, wherein:

BRIEF DESCRIPTION OF THE DRAWINGS

FIG. 5 is a perspective exploded view of the present invention;

FIG. 6 is a top view of the present invention;

DETAILED DESCRIPTION OF THE PREFERRED EMBODIMENTS

Figure 1:
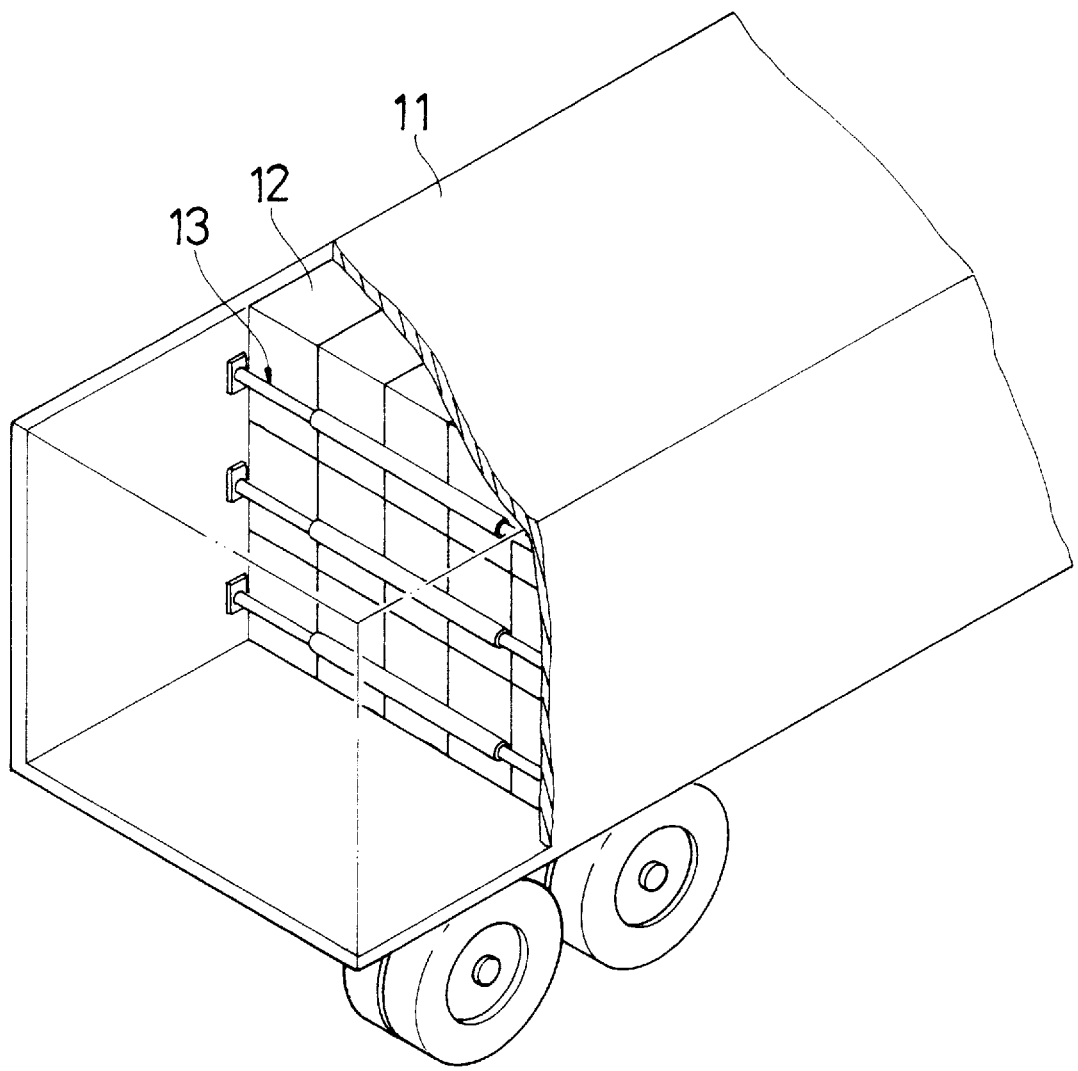
FIG. 1 shows a conventional manually rotatable retaining/fixing rod used in a container for fixing cargoes.
Figure 2:
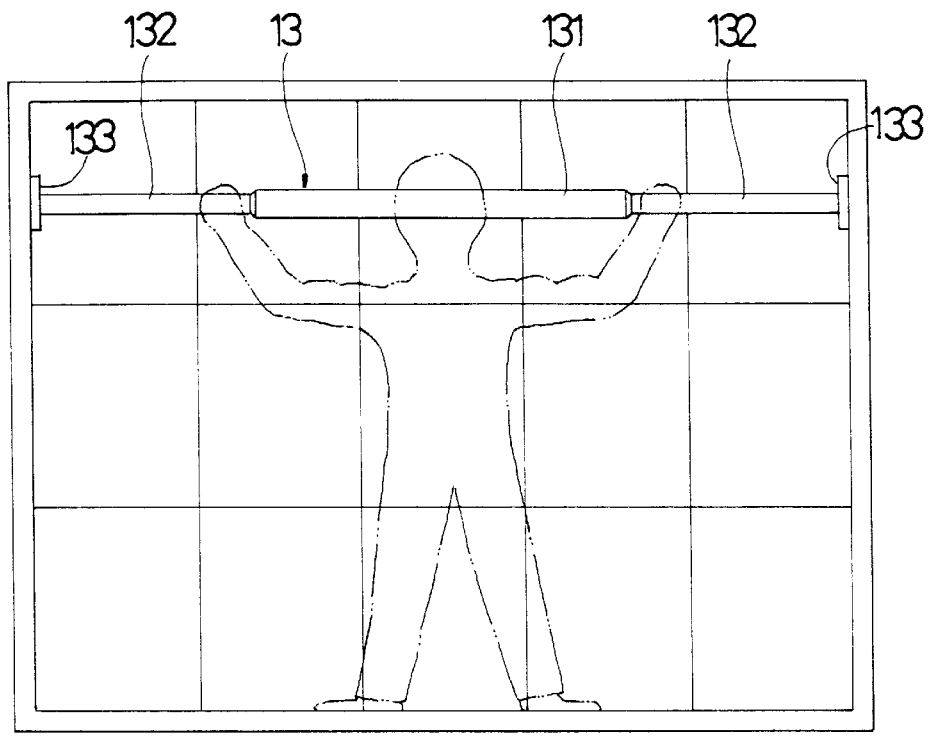
FIG. 2 shows that the retaining/fixing rod of FIG. 1 is rotated by a user with both hands.
Figure 3:
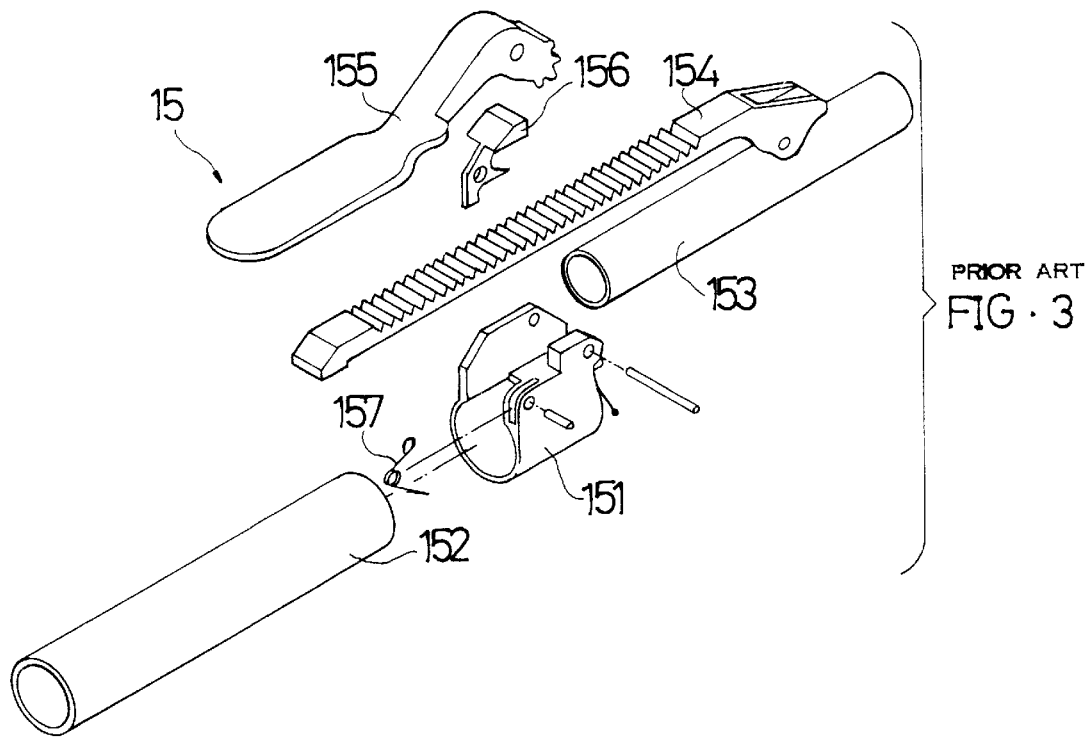
FIG. 3 is a perspective exploded view another conventional retaining/fixing device.
Figure 4:
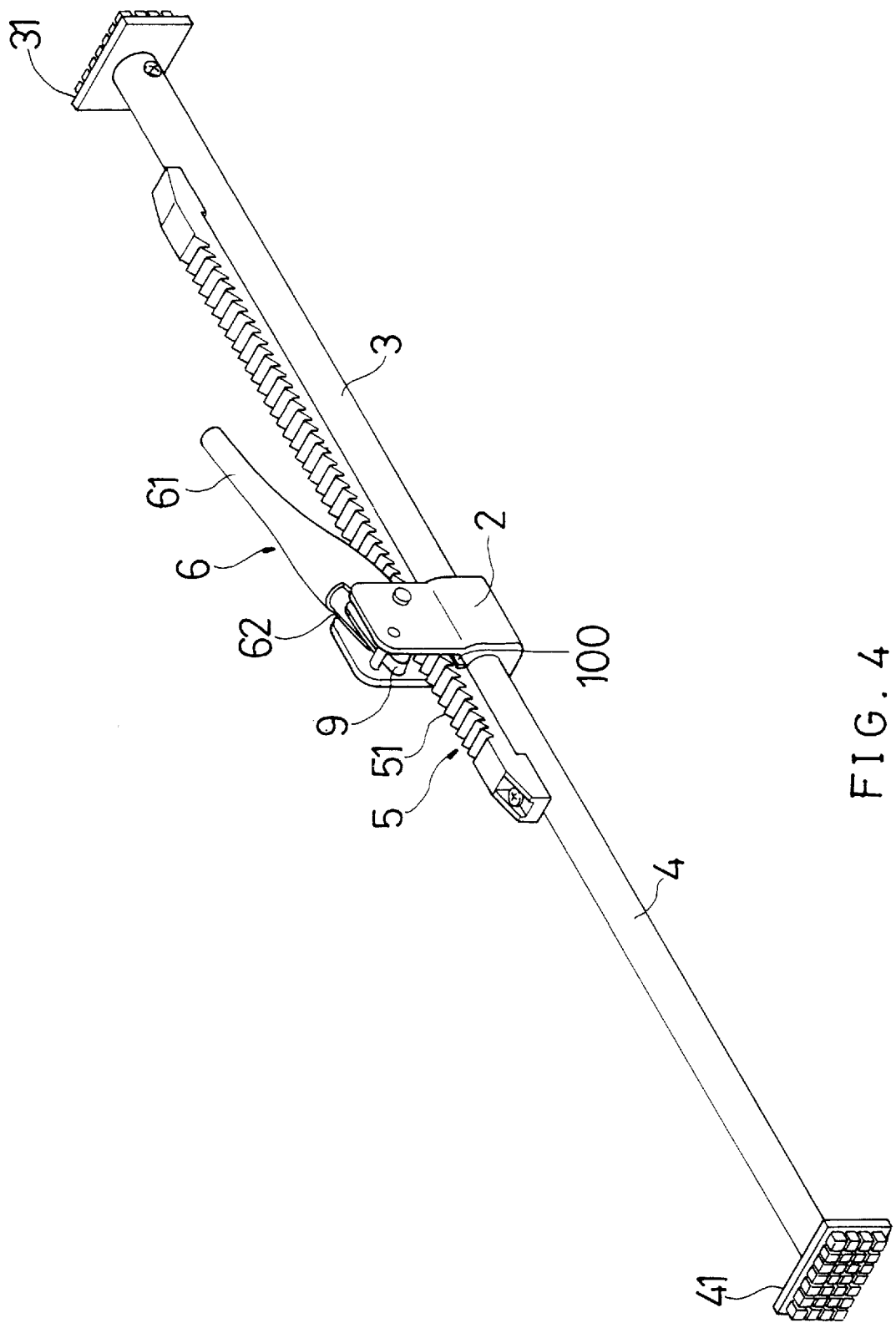
FIG. 4 is a perspective assembled view of the present invention.

Please refer to FIGS. 4 to 7. The retaining/fixing device of the present invention includes a base seat 2, an outer tube 3, an inner rod 4, a rack 5, a handle 6, a first claw 7, a second claw 8, a resilient plate 9 and a stopper pin 94.

The bottom of the base seat 2 is formed with a hollow section 21 having a large diameter portion 211 and a coaxial small diameter portion 212. A pair of fixing boards 22 upward extend from the top of the base seat to define a channel 23. The fixing boards 22 are formed with a pair of pivot holes 231 and a pair of stopper pin holes 232.

The outer tube 3 is fixed in the large diameter portion 211 of the hollow section 21 of the base seat 2. The outer end of the outer tube 3 is disposed with a contacting pad 31.

The inner rod 4 is fixed in the small diameter portion 212 of the hollow section 21 of the base seat 2. The outer end of the inner rod 4 is disposed with a contacting pad 41.

The rack 5 is disposed in the channel 23 of the base seat 2. One end of the rack 5 is secured on the outer tube 3. The rack 5 is formed with multiple teeth 51 each having a vertical face 511 and an about 45 degree inclined face 512.

The handle 6 has an elongated grip 61 at one end and a pair of parallel pivot sections 62 at the other end pivotally disposed in the channel 23. The pivot sections 61 are formed with a pair of first holes 621 for pivotally disposed the first pivot shaft 24 and a pair of second holes 622 for pivotally disposed the second pivot shaft 25.

One end of the first claw 7 is pivotally disposed on the first pivot shaft 24 of the first holes 621 of the handle 6. The other end of the first claw 7 is disposed with a first end section 71 with sharp angle.

The second claw 8 has a length shorter than that of the first claw 7. One end of the second claw 8 is pivotally disposed on the second pivot shaft 25 passing through the second holes 622 of the handle 6 and the pivot holes 231 of the base seat 2. The other end of the second claw 8 is disposed with a second end section 81 with sharp angle.

The resilient plate 9 has a central straight section 91, a first bight section 92 at one end and a second bight section 93 at the other end. The free end of the first bight section 92 is fixed at the first end section 71 of the first claw 7. The free end of the second bight section 93 is fixed at the second end section 81 of the second claw 8.

The stopper pin 94 is fixed in the stopper pin holes 232 of the base seat 2 for stopping the resilient plate 9.

Figure 7:
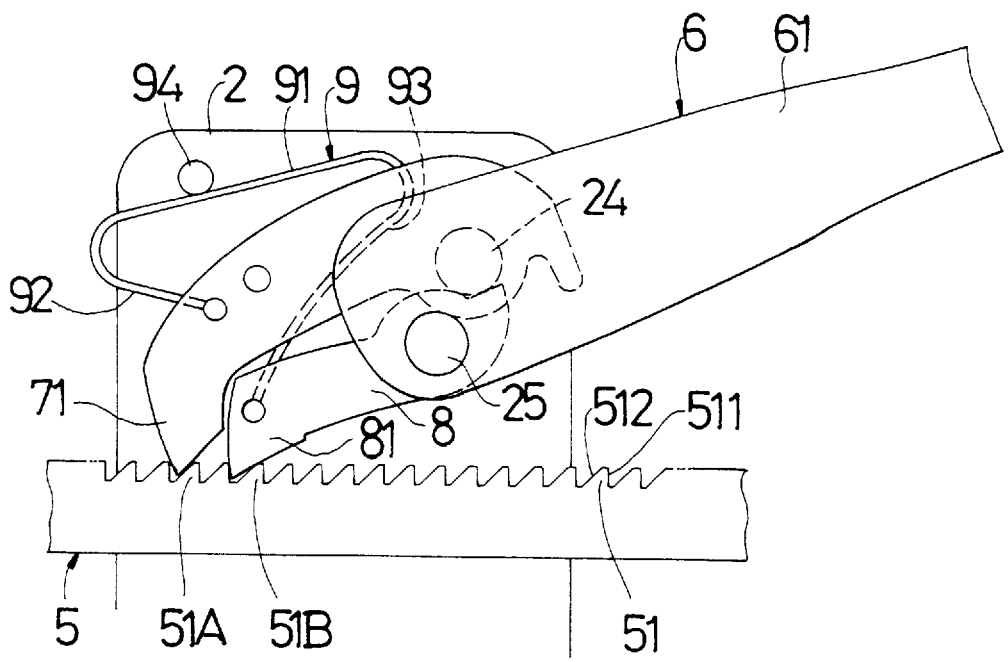
FIG. 7 is a side view showing the present invention in a normal state.

According to the above arrangement, in normal state as shown in FIG. 7, the outward first end section 71 of the first claw 7 is engaged in the first tooth 51A of the rack 5, while the inward second end section 81 of the second claw 8 is engaged in the second tooth 51B of the rack 5. The first tooth 51A is spaced from the second tooth 51B by one tooth 51.

Figure 8:
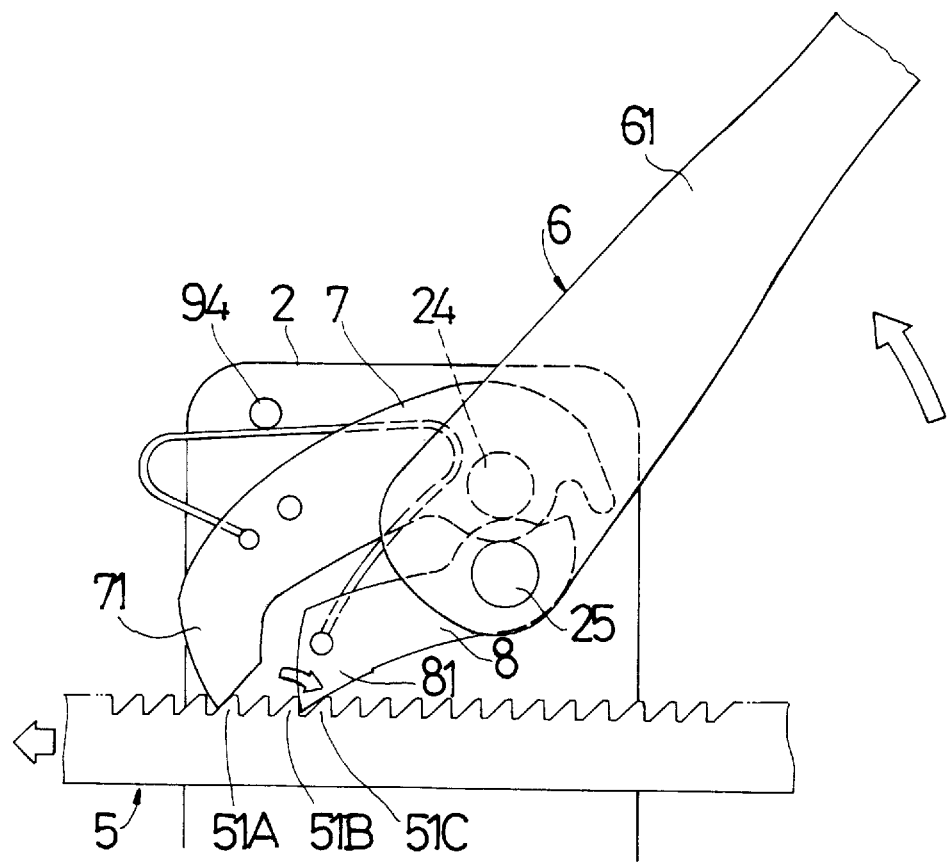
FIG. 8 is a side view according to FIG. 7, in which the handle is lifted.

When lifting the handle 6 as shown in FIG. 8, the handle 6 is counterclockwise rotated about the second pivot shaft 24 so that the first pivot shaft 25 is displaced leftward. Accordingly, the first end section 71 of the first claw 7 will push the rack 5 so as to drivingly outward move the inner rod 4. At this time, the second end section 81 of the second claw 8 will gradually move away from the first end section 71 of the first claw 7 to get into another tooth 51C adjacent to the second tooth 51B. At this time, the first claw 7 is spaced from the second claw 8 by two teeth.

Figure 9:
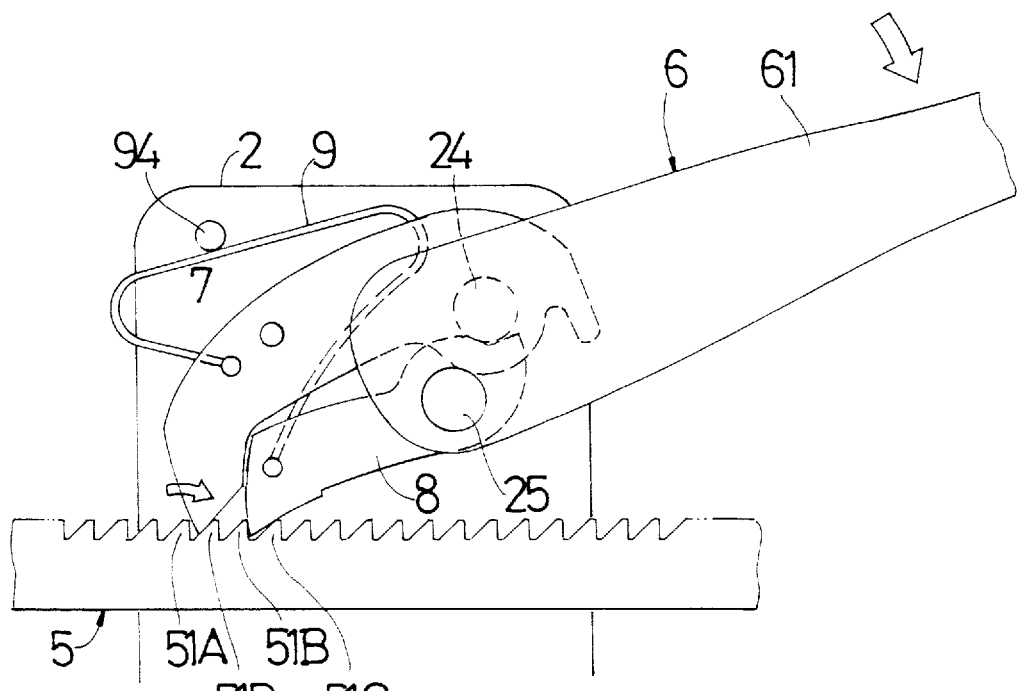
FIG. 9 is a side view according to FIG. 7, in which the handle is depressed.

When depressing the handle 6 as shown in FIG. 9, the handle 6 is clockwise rotated about the second pivot shaft 25 so that the first pivot shaft 24 is displaced rightward. In addition, both the first and second claws 7, 8 are restricted and pushed by the resilient plate 9 so that the first end section 71 of the first claw 7 is moved rightward to gradually get close to the second end section 81 of the second claw 8 and get into another tooth 51D adjacent to the first tooth 51A. At this time, the first claw 7 is again spaced from the second claw 8 by one tooth 51, that is, the first claw 7 is forcedly advanced by one pitch. Therefore, by means of reciprocally lifting and depressing the handle 6, the outer tube 3 is displaced relative to the inner rod 4 each time by one pitch. Accordingly, the user can forcedly stretch the retaining/fixing device of the present invention to a necessary extent.

Many modifications can be made without departing from the spirit of the present invention. For example, an abrasion-resistant pad member 100, shown in FIG. 4 can be disposed between the rack 5 and the bottom of the channel 23 of the base seat 2 so as to prevent the rack 5 from being directly abraded.

Figure 10:
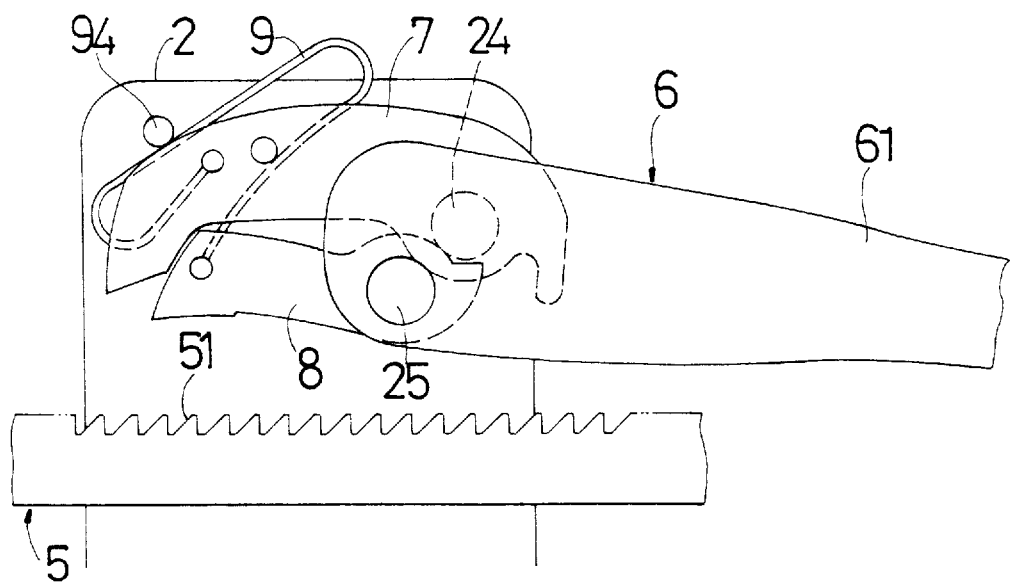
FIG. 10 is a side view according to FIG. 7, in which the handle is depressed to a position substantially parallel to the outer tube for quickly drawing out or retracting the inner rod.

Referring to FIG. 10, when it is desired to quickly draw out the inner rod 4 or retract the inner rod 4 into the outer tube 5, the handle 6 is first depressed to a position substantially parallel to the axis of the outer tube 3. At this position, the first and second claws 7, 8 are both lifted without contacting with the rack 5 so that the user can then quickly draw out or retract the inner rod 4.

In actual use, in the case that the width between the inner walls of a container is 2 meters, the user can first quickly draw out the inner rod 4, making the total length of the retaining/fixing device reach about 1.98 meters. Then the handle 6 is reciprocally lifted and depressed so as to forcedly stretch the retaining/fixing device to a certain retaining force for firmly retaining and fixing the cargoes in the container.

The present invention has the following advantages:

1. The retaining/fixing device can be forcedly tightened to a needed extent. By means of the cooperation between the handle 6, first and second claws 7, 8 and the resilient plate 9, the handle 6 can be reciprocally lifted and depressed to continuously push the rack 5 to a necessary extent of tightness.

2. The inner rod can be quickly drawn out or retracted. When the handle 6 is depressed to a position substantially parallel to the axis of the outer tube 3, the user can quickly draw out or retract the inner rod 4. This facilitates the use of the present invention.

3. The present invention is applicable in many other fields in addition to the container. For example, in construction site, the present invention can be used as a vertical or horizontal retainer for concrete forms. Moreover, the dimension of the present invention can be modified so that the present invention can serve as a jack for car.

It is to be understood that the above description and drawings are only used for illustrating some embodiments of the present invention, not intended to limit the scope thereof. Any variation and derivation from the above description and drawings should be included in the scope of the present invention.

What is claimed is:

1. A retaining/fixing device comprising:

a base seat including a hollow section extending longitudinally therethrough and having a large diameter portion and a coaxial small diameter portion, said base seat having a top, a pair of fixing boards extending upward from said top of said base seat to define a channel therebetween, each of said fixing boards having a pivot hole and a stopper pin hole;

an outer tube fixed in said large diameter portion of said hollow section of said base seat;

an inner rod movably fitted in said small diameter portion of said hollow section of said base seat;

a rack disposed in said channel of said base seat, one end of said rack being secured to an inner end of said inner rod, said rack having multiple teeth, including a first tooth and a second tooth, each having a vertical face and an inclined face;

a handle having an elongated grip at one end thereof and a pair of parallel pivot sections at an opposing end thereof, said pivot sections being pivotally disposed in said channel of said base seat, each of said pivot sections having a first hole and a second hole formed therethrough, said handle having a first pivot shaft protruding through said first holes in each of said parallel pivot sections, and a second pivot shaft protruding through said second holes in each of said parallel pivot sections;

a first claw having one end thereof pivotally disposed on said first pivot shaft and another end of said first claw having a first end section with a sharp angle;

a second claw having a length shorter than that of said first claw, one end of said second claw being pivotally disposed on said second pivot shaft passing through said second holes of said parallel pivot sections and said pivot holes of said base seat, and another end of said second claw having a second end section with a sharp angle;

a resilient plate having a central straight section, a first bight section at one end of said central straight section, and a second bight section at another end of said central straight section, a free end of said first bight section engaging said first end section of said first claw, a free end of the second bight section engaging said second end section of said second claw; and a stopper pin protruding through said stopper pin hole on each of said fixing boards of said base seat for stopping said resilient plate;

wherein, in a normal state of said retaining/fixing device, said first end section of said first claw engages said first tooth of said rack, while said second end section of said second claw engages said second tooth of said rack, said first tooth being spaced from said second tooth by a predetermined number of teeth; wherein, once said handle has been lifted, said first end section of said first claw pushes said rack, thereby outwardly moving said inner rod and thereby gradually moving said second end section of said second claw away from said first end section of said first claw to engage another tooth adjacent to said second tooth; and wherein, once said handle has been depressed, both said first and second claws are pushed by said resilient plate, thereby allowing said first end section of said first claw to approach said second end section of said second claw and engage another tooth adjacent to said first tooth, thereby forcing said first claw to advance by one pitch, thereby displacing said outer tube relative to said inner rod by repeatedly lifting and depressing said handle.

2. The retaining/fixing device as claimed in claim 1, further including an abrasion-resistant pad disposed at member disposed between said rack and a bottom of said channel of said base seat.

3. The retaining/fixing device as claimed in claim 1, further including a contacting pad disposed at each of outer ends of said outer tube and said inner rod.

\* \* \* \* \*